March 17, 1959     E. A. STALKER     2,877,980
VIBRATION DAMPERS FOR GAS TURBINE WHEELS AND THE LIKE
Filed Sept. 28, 1954
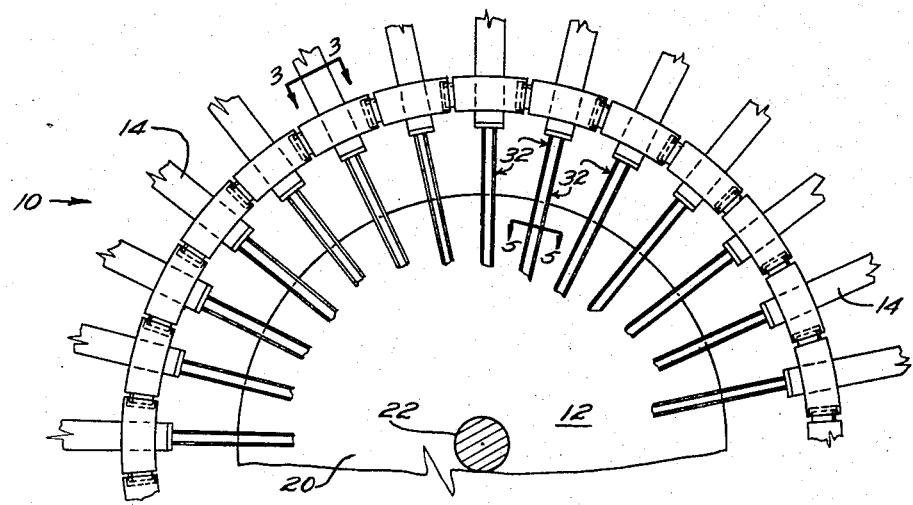
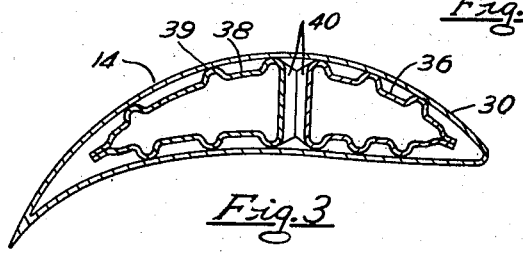
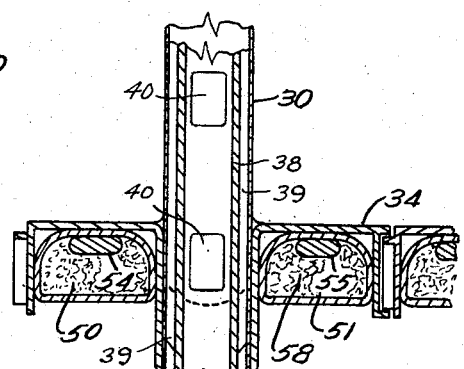
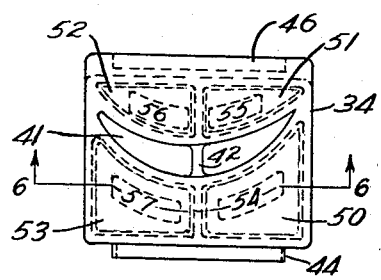
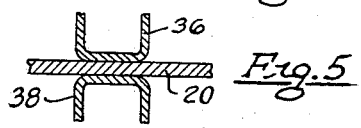
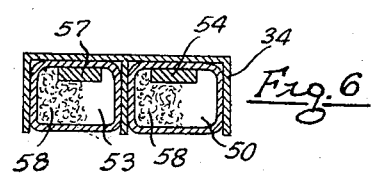
INVENTOR.
Edward A. Stalker

United States Patent Office 2,877,980
Patented Mar. 17, 1959

2,877,980

VIBRATION DAMPERS FOR GAS TURBINE WHEELS AND THE LIKE

Edward A. Stalker, Bay City, Mich., assignor to The Stalker Development Company, Bay City, Mich., a corporation of Michigan Application September 28, 1954, Serial No. 458,910

7 Claims. (Cl. 253—77)

This invention relates to gas turbines and particularly to their bladed wheels.

An object of the invention is to provide a means of damping the vibrations of the blades.

Another object is to provide a damping means particularly adapted to sheet metal blades and wheels.

Other objects will appear from the description, drawings and claims.

The above objects are accomplished by the means illustrated in the accompanying drawings in which—

Fig. 1 is an axial front view of a fragment of a turbine wheel according to this invention;

Fig. 2 is a fragmentary section on an enlarged scale taken through the wheel in Fig. 1 in a plane parallel to the disk;

Fig. 3 is a section of a blade on line 3—3 in Fig. 1;

Fig. 4 is a plan view of a rim segment from outside the wheel;

Fig. 5 is a fragmentary section on line 5—5 in Fig. 1, and

Fig. 6 is a section on line 6—6 of Fig. 4.

Referring now to the drawings, a turbine wheel according to this invention is indicated generally by 10. It comprises the hub structure 12 and the blades 14.

The hub structure comprises the hub disk 20 having the shaft 22 fixed thereto for mounting in a machine for rotation about the shaft axis.

The blades of the wheel are preferably of hollow construction and include the blade skin 30 having an integral connection with stem means 32. A plurality of rim segments 34 form the rim of the wheel. Each of these rim segments is carried by an associated blade, being connected to the blade adjacent the end thereof nearest to the disk 20, and each rim segment is arranged to vibrate with the associated blade. There are no rigid connections between adjacent rim segments.

The stem is preferably made in two parts, as shown, a front part 36 and a rear part 38. These parts have ridges like 39 therein and the blade skin is fixed to them by solder or other fused metal. Dimples 40 are provided on both parts 36 and 38, and are arranged to abut in assembly for attachment to each other by brazing or similar attachment with fused metal. Thus the front and rear parts 36 and 38 are assembled to provide a stem within each of the blades, as seen in Figs. 2 and 3.

The stem parts are spaced apart to straddle the hub disk as shown in Figs. 11 and 5. They are preferably connected to the disk with high temperature solder although they may also be fixed by other fused metal such as by welding.

The locality of attachment of the stem parts 36 and 38 to the disk is a substantial distance inward from the wheel rim, as is apparent from an inspection of Figs. 1 and 2, wherein the periphery of hub disk 20 is shown as located radially inwardly of the wheel from the plurality of interfitted rim segments 34 which form the rim of the wheel. The wheel rim is thus located adjacent the base or root ends of blades 14 and is spaced radially outwardly of the periphery of disk 20. This establishes the center of vibration of the blades in the vicinity of the perimeter of the disk.

The blades pass through the openings 41 in the rim segments which are fixed to their respective blades at substantial distances out from the perimeter of the disk. The segments are spaced apart peripherally providing gaps between them and thus permitting them to vibrate. A neck portion 42 is provided on each rim segment 34 to extend between the front and rear ports 36 and 38 of blade stems 32, and the neck portions 42 are suitably secured between the parts of the blade stem to provide for vibration of the blade, stem, and attached rim segment as a unit.

Each segment has at one peripheral end a hollow projection 44 and at the other end a recess 46. Each projection of one segment fits slidably into the recess of the adjacent segment to seal the gap between segments while permitting them to move one relative to the other in the peripheral directions.

Each segment 34 is of hollow construction, and the interior of the segments includes means defining four closed cavities 50–53, each of which contains one of the damper bars 54–57 and a quantity of damping powder 58. As each blade vibrates in a direction approximately parallel to the periphery of the wheel the damping bars are thrown from one side of the other of their respective cavities. The bars must plow relatively through the powder which aids in dissipation of energy by friction. Also the outer wall of each cavity is curved inward toward the axis of hub disk 20 along the peripheral direction which forces the powder and the ends of each bar to move relatively inward against the action of centrifugal force. The curvature, cooperating with centrifugal force on the bars, also tends to position each bar at the maximum radius and prepare it for a peripheral and radial motion.

The dissipation of the energy of vibration in the rim segment cavities damps the vibration of the blades and greatly increases their useful life.

It is desirable to place the powder in the rim segment where the centrifugal forces are relatively low, since the powder is then compacted to a lesser degree and is more readily moved or thrown in response to vibration of the blade. Furthermore, it is desirable that the powder be thrown against a surface curved radially inwardly, as at the upper ends of the cavities in Fig. 2, so that the powder will be deflected inwardly toward the center of the cavity. The damping effect is somewhat greater if such radial movement of the powder is provided.

Cavities 50–53 preferably have a large volume relative to the size of the segments 34, and occupy a major portion of the interior of each such rim segment. Each of the bars 54–57 can move with any combination of motions both axially and peripherally with respect to the wheel, and since the bars slide relative to the segments, the damping effect is not tuned to a selected frequency, but rather is effective at all frequencies of vibration.

By providing a plurality of cavities and bars the damper provided by this invention also damps torsional vibrations about a spanwise or radial axis. Thus, the cavities 50–53 are located outwardly of the blades, being carried in the rim segment associated with the blade. The bars 54–57 are movable within the cavities in any combination of directions, as pointed out above, and therefore torsional or twisting vibration of the blade and rim segment assemblies, about an axis extending through the blade and the connecting means provided by the fixed joint between the stem parts and the disk, may be damped by movement of the damping bars and the damping powder in a similar manner.

While I have illustrated a specific form of the invention, it is to be understood that variations may be made therein and that I intend to claim my invention broadly as indicated by the appended claims.

I claim:

1. In a bladed wheel for a gas turbine the combination of a disk adapted for rotation about an axis extending transversely of said disk under the action of a motive gas stream, a plurality of blades spaced about the periphery of said disk, stem means fixed to said blades and fixed to said disk at points on said disk spaced radially inwardly thereof from the adjacent ends of said blades and defining a center of vibration for each said blade, a rim segment carried by each said blade at the radially inner end thereof adjacent said disk to form a rim on said wheel, said rim segments being mounted adjacent but spaced from each other for vibratory movement with its associated blade independently of adjacent segments, each of said rim segments having a cavity therein, and a quantity of damping powder contained within each said cavity to damp vibrations of the associated said blade.

2. In a bladed wheel for a gas turbine or the like the combination of a disk adapted for rotation about an axis extending transversely of said disk, a plurality of blades spaced about the periphery of said disk and extending radially thereof, a rim segment carried by each said blade adjacent the end thereof nearest to said disk to form a rim on said wheel, said rim segments being mounted adjacent but spaced from each other for independent vibratory movement with their associated blades, means connecting said blades to said disk radially inwardly of said rim segments and defining a center of vibration for each of said blades and its associated said rim segment, each said segment having a hollow interior including means defining a closed cavity, the volume of said cavity constituting a major portion of the hollow interior of said segment, and a quantity of damping powder contained within each said cavity to damp vibrations of the associated said blade and rim segment.

3. In a bladed wheel for a gas turbine or the like the combination of a disk adapted for rotation about an axis extending transversely of said disk, a plurality of blades peripherally spaced about said disk and extending radially thereof, a rim segment surrounding and secured to each said blade adjacent the end thereof nearest to said disk to form a rim on said wheel, said rim segments being mounted adjacent but spaced from and interfitting with each other to form an effectively sealed rim while leaving each blade and rim segment subject to vibratory movement independently of the others, means connecting said blades to said disk radially inwardly of said rim segments, each said segment having a hollow interior including means defining a closed cavity located at one side of the associated said blade, and a quantity of damping powder in each said cavity to damp vibrations of its associated said blade.

4. In a bladed wheel for a gas turbine or the like the combination of a disk adapted for rotation about an axis extending transversely of said disk, a plurality of blades peripherally spaced about said disk and extending radially thereof, a rim segment carried by each said blade in surrounding relation therewith, said rim segments being located adjacent the ends of said blades nearest to said disk, said rim segments being mounted adjacent but spaced from each other to form a rim on said wheel, means connecting said blades to said disk radially inwardly of said rim, each said blade and its associated said rim segment being subject to vibration independently of adjacent said blades and rim segments, each said segment having a hollow interior including means defining a plurality of closed cavities positioned outwardly of the radial projection of the associated said blade, and damping powder in each of said cavities for damping vibrations of the associated said blade.

5. In a bladed wheel for a gas turbine or the like the combination of a disk adapted for rotation about an axis extending transversely of said disk, a plurality of blades peripherally spaced about said disk and extending radially thereof, a rim segment on each said blade adjacent the end thereof nearest to said disk, said rim segments being mounted adjacent each other to form a rim on said wheel, means connecting said blades to said disk radially inwardly of said rim and defining a center of vibration for each of said blades and its associated said rim segment, each said segment having a hollow interior including means defining a closed cavity within said segment, said cavity defining means including an interior surface on the radially outward side of said cavity having a portion thereof curved inwardly toward the periphery of said disk, and movable material contained in said cavity slidable along said curved surface portion to damp vibration of said blades and rim segments.

6. In a bladed wheel of the character described the combination of a disk adapted for rotation about an axis extending transversely thereof, a plurality of blades spaced about the periphery of said disk and extending radially thereof, a rim segment carried by each said blade adjacent the ends of said blades nearest to said disk, said rim segments being mounted adjacent each other to form a rim on said wheel, means connecting said blades to said disk radially inwardly of said rim and defining a center of vibration for each of said blades and the associated said rim segment, each of said rim segments having a closed cavity therein, a quantity of damping powder contained within each of said cavities, and a damping bar in each of said cavities, said bar being each of substantially less volume than said cavities to provide for sliding movement of said bars within said cavities for damping vibrations of the associated said blade and rim segment.

7. In a bladed wheel of the character described the combination of a disk adapted for rotation about an axis extending transversely of said disk, a plurality of blades peripherally spaced about said disk and extending radially thereof, a rim segment carried by each of said blade in surrounding relation therewith, said rim segments being located adjacent the ends of said blades nearest to said disk, said rim segments being spaced from and interfitted with each other to form an effectively closed rim on said wheel, means connecting said blades to said disk radially inwardly of said rim and defining a center of vibration for each of said blades and the associated said rim segment, each said blade and its associated said rim segment being subject to vibration independently of adjacent said blades and rim segments, each said rim segment having a hollow interior including means defining a plurality of closed cavities positioned outwardly of the radial projection of the associated said blade, damping powder in each of said cavities, and a damping bar in each of said cavities slidable within said cavity and through the powder contained therein for damping vibrations of the associated said blade and rim segment.

References Cited in the file of this patent

UNITED STATES PATENTS

| 1,894,276 | Lampton | Jan. 17, 1933 |
| 2,349,187 | Meyer | May 16, 1944 |
| 2,417,347 | Brown | Mar. 11, 1947 |
| 2,469,167 | Little | May 3, 1949 |

FOREIGN PATENTS

| 651,449 | Great Britain | Apr. 4, 1951 |

UNITED STATES PATENT OFFICE
CERTIFICATE OF CORRECTION

Patent No. 2,877,980                                                      March 17, 1959

Edward A. Stalker

It is hereby certified that error appears in the printed specification of the above numbered patent requiring correction and that the said Letters Patent should read as corrected below.

Column 1, line 62, for "Figs. 11 and 5." read -- Figs. 1 and 5. --; column 4, lines 45 and 46, for "by each of said blade" read -- by each said blade --.

Signed and sealed this 11th day of August 1959.

(SEAL)

Attest:

KARL H. AXLINE
Attesting Officer

ROBERT C. WATSON
Commissioner of Patents